United States Patent
Li et al.

(10) Patent No.: US 8,200,344 B2
(45) Date of Patent: Jun. 12, 2012

(54) EXTREMUM SEEKING CONTROL WITH RESET CONTROL

(75) Inventors: Yaoyu Li, Franklin, WI (US); John E. Seem, Glendale, WI (US)

(73) Assignee: Johnson Controls Technology Company, Holland, MI (US)

( * ) Notice: Subject to any disclaimer, the term of this patent is extended or adjusted under 35 U.S.C. 154(b) by 234 days.

(21) Appl. No.: 12/650,366

(22) Filed: Dec. 30, 2009

(65) Prior Publication Data

US 2010/0106328 A1    Apr. 29, 2010

Related U.S. Application Data

(63) Continuation of application No. PCT/US2008/070118, filed on Jul. 16, 2008.

(60) Provisional application No. 60/950,314, filed on Jul. 17, 2007, provisional application No. 60/962,833, filed on Aug. 1, 2007.

(51) Int. Cl.
  G05B 13/02   (2006.01)
  G05D 23/00   (2006.01)
  G06F 11/00   (2006.01)

(52) U.S. Cl. ............... 700/38; 700/28; 700/29; 700/30; 700/31; 700/32; 700/33; 700/34; 700/275; 700/276; 700/299; 700/300; 714/39; 714/E11.024

(58) Field of Classification Search ............. 700/28–34, 700/38, 275, 276, 299, 300; 714/39, E11.024
See application file for complete search history.

(56) References Cited

U.S. PATENT DOCUMENTS

| | | | |
|---|---|---|---|
| 2,812,141 A | 11/1957 | Sueda et al. | |
| 3,181,791 A | 5/1965 | Axelrod | |
| 4,026,251 A * | 5/1977 | Schweitzer et al. | ..... 123/406.23 |
| 4,114,807 A | 9/1978 | Naseck et al. | |
| 4,182,180 A | 1/1980 | Mott | |
| 4,199,101 A | 4/1980 | Bramow et al. | |
| 4,257,238 A | 3/1981 | Kountz et al. | |
| 4,319,461 A | 3/1982 | Shaw | |
| 4,512,161 A | 4/1985 | Logan et al. | |
| 4,558,595 A | 12/1985 | Kompelien | |
| 4,607,789 A | 8/1986 | Bowman | |
| 4,872,104 A | 10/1989 | Holsinger | |
| 4,876,858 A | 10/1989 | Shaw et al. | |
| 4,942,740 A | 7/1990 | Shaw et al. | |
| 5,251,814 A | 10/1993 | Warashina et al. | |
| 5,346,129 A | 9/1994 | Shah et al. | |

(Continued)

FOREIGN PATENT DOCUMENTS

JP    63-231127 A    9/1988

(Continued)

OTHER PUBLICATIONS

Office Action for U.S. Appl. No. 11/699,860, dated Jun. 9, 2010, 9 pages.

(Continued)

*Primary Examiner* — Albert Decady
*Assistant Examiner* — Jason Lin
(74) *Attorney, Agent, or Firm* — Foley & Lardner LLP

(57) ABSTRACT

An extremum seeking control method optimizes a control process for a plant such as an air handling unit. The method compensates for abrupt changes in the operation of the plant by resetting the extremum seeking control strategy in response to a detection of the abrupt change.

14 Claims, 9 Drawing Sheets

U.S. PATENT DOCUMENTS

| | | | |
|---|---|---|---|
| 5,351,855 | A | 10/1994 | Nelson et al. |
| 5,355,305 | A * | 10/1994 | Seem et al. .................... 700/41 |
| 5,414,640 | A | 5/1995 | Seem |
| 5,461,877 | A | 10/1995 | Shaw et al. |
| 5,467,287 | A | 11/1995 | Wenner et al. |
| 5,506,768 | A | 4/1996 | Seem et al. |
| 5,555,195 | A | 9/1996 | Jensen et al. |
| 5,568,377 | A | 10/1996 | Seem et al. |
| 5,590,830 | A | 1/1997 | Kettler et al. |
| 5,675,979 | A | 10/1997 | Shah |
| 5,682,329 | A | 10/1997 | Seem et al. |
| 5,769,315 | A | 6/1998 | Drees |
| 5,791,408 | A | 8/1998 | Seem |
| 5,867,384 | A | 2/1999 | Drees et al. |
| 6,006,142 | A | 12/1999 | Seem et al. |
| 6,098,010 | A * | 8/2000 | Krener et al. .................. 701/100 |
| 6,115,713 | A | 9/2000 | Pascucci et al. |
| 6,118,186 | A * | 9/2000 | Scott et al. ................... 290/40 B |
| 6,122,605 | A | 9/2000 | Drees et al. |
| 6,161,764 | A | 12/2000 | Jatnieks |
| 6,219,590 | B1 | 4/2001 | Bernaden, III et al. |
| 6,223,544 | B1 | 5/2001 | Seem |
| 6,265,843 | B1 | 7/2001 | West et al. |
| 6,269,650 | B1 | 8/2001 | Shaw |
| 6,296,193 | B1 | 10/2001 | West et al. |
| 6,326,758 | B1 * | 12/2001 | Discenzo ....................... 318/609 |
| 6,369,716 | B1 | 4/2002 | Abbas et al. |
| 6,389,331 | B1 | 5/2002 | Jensen et al. |
| 6,408,228 | B1 | 6/2002 | Seem et al. |
| 6,415,617 | B1 | 7/2002 | Seem |
| 6,477,439 | B1 | 11/2002 | Bernaden, III et al. |
| 6,594,554 | B1 | 7/2003 | Seem et al. |
| 6,816,811 | B2 | 11/2004 | Seem |
| 6,862,540 | B1 | 3/2005 | Welch et al. |
| 6,937,909 | B2 | 8/2005 | Seem |
| 6,973,793 | B2 | 12/2005 | Douglas et al. |
| 7,031,880 | B1 | 4/2006 | Seem et al. |
| 7,050,873 | B1 | 5/2006 | Discenzo |
| 7,113,890 | B2 | 9/2006 | Frerichs et al. |
| 7,124,637 | B2 | 10/2006 | Singhal et al. |
| 7,434,413 | B2 | 10/2008 | Wruck |
| 7,578,734 | B2 | 8/2009 | Ahmed et al. |
| 7,685,830 | B2 | 3/2010 | Thybo et al. |
| 7,827,813 | B2 * | 11/2010 | Seem .............................. 62/186 |
| 2004/0164690 | A1 | 8/2004 | Degner et al. |
| 2005/0006488 | A1 | 1/2005 | Stanimirovic |
| 2005/0040250 | A1 | 2/2005 | Wruck |
| 2006/0090467 | A1 | 5/2006 | Crow |
| 2006/0259285 | A1 | 11/2006 | Bahel et al. |
| 2007/0023533 | A1 | 2/2007 | Liu |
| 2007/0191967 | A1 | 8/2007 | Yo et al. |
| 2008/0097651 | A1 | 4/2008 | Shah et al. |
| 2008/0179408 | A1 | 7/2008 | Seem |
| 2008/0179409 | A1 * | 7/2008 | Seem ........................... 236/49.3 |
| 2008/0277486 | A1 | 11/2008 | Seem et al. |
| 2009/0001179 | A1 * | 1/2009 | Dempsey ..................... 236/49.3 |
| 2009/0083583 | A1 | 3/2009 | Seem et al. |
| 2009/0099698 | A1 * | 4/2009 | Masui et al. .................. 700/276 |
| 2009/0308941 | A1 | 12/2009 | Patch |
| 2010/0082161 | A1 | 4/2010 | Patch |
| 2010/0106328 | A1 | 4/2010 | Li et al. |
| 2010/0106331 | A1 | 4/2010 | Li et al. |

FOREIGN PATENT DOCUMENTS

| | | |
|---|---|---|
| JP | 04-062352 A | 2/1992 |
| JP | 10-047738 A | 2/1998 |
| SU | 535103 A | 11/1976 |
| WO | WO 00/68744 A1 | 11/2000 |
| WO | WO 2009/012269 A2 | 1/2009 |
| WO | WO 2009/012282 A2 | 1/2009 |

OTHER PUBLICATIONS

Adetola et al., Adaptive Extremum-Seeking Receding Horizon Control of Nonlinear Systems, American Control Conference Proceedings, 2004, pp. 2937-2942.

Adetola et al., Adaptive Output Feedback Extremum Seeking Receding Horizon Control of Linear Systems, ScienceDirect, Elsevier, Journal of Process Control, vol. 16, 2006, pp. 521-533.

Adetola et al., Parameter Convergence in Adaptive Extremum-Seeking Control, ScienceDirect, Elsevier, Automatica, vol. 43, available online Sep. 28, 2006, pp. 105-110.

Ariyur et al., Analysis and Design of Multivariable Extremum Seeking, Proceedings of the American Control Conference, Anchorage, Alaska, May 8-10, 2002, pp. 2903-2908.

Ariyur et al., Multivariable Extremum Seeking Feedback: Analysis and Design, 2002, 15 pages.

Ariyur et al., Real Time Optimization by Extremum Seeking Control, John Wiley & Sons, Oct. 2003.

Ariyur et al., Slope Seeking and Application to Compressor Instability Control, Proceeding of the 41st IEEE Conference on Decision and Control, Las Vegas, Nevada, Dec. 2002, pp. 3690-3697.

Ariyur et al., Slope Seeking: A Generalization of Extremum Seeking, International Journal of Adaptive Control and Signal Processing, vol. 18, 2004, 22 pages.

Ashrae Standard, Energy Standard for Buildings Except Low-Rise Residential Buildings I-P Edition, ANSI/ASHRAE/IESNA Standard 90.1-2004, 4 pages.

Astrom et al., Optimalizing Control, Adaptive Control Second Edition, 1995, pp. 214-230, Addison-Wesley Publishing Company.

Banaszuk et al., Adaptive Control of Combustion Instability Using Extremum-Seeking, Proceedings of the American Control Conference, Chicago, Illinois, Jun. 2000, pp. 416-422.

Banavar et al., Functional Feedback in an Extremum Seeking Loop, Proceedings of the 40th IEEE Conference on Decision and Control, Orlando, Florida, Dec. 2001, pp. 1316-1321.

Banavar, Extremum Seeking Loops with Quadratic Functions: Estimation and Control, International Journal of Control, vol. 76, No. 14, 2003, pp. 1475-1482.

Beaudoin et al., Bluff-Body Drag Reduction by Extremum-Seeking Control, Journal of Fluids and Structures, vol. 22, 2006, pp. 973-978.

Binetti et al., Control of Formation Flight via Extremum Seeking, Proceedings of the American Control Conference, Anchorage, Alaska, May 8-10, 2002, pp. 2848-2853.

Blackman, Extremum-Seeking Regulators, An Exposition of Adaptive Control, Pergamon Press, 1962.

Cowan, Review of Recent Commercial Roof Top Unit Field Studies in the Pacific Northwest and California, report for Northwest Power and Conservation Council and Regional Technical Forum, Oct. 8, 2004, 18 pages.

DOE Federal Emergency Management Program, Actions You Can Take to Reduce Cooling Costs, taken from http://www1.eere.energy.gov/femp/pdfs/om_cooling.pdf, believed to be available May 2005, 8 pages.

Drakunov et al., ABS Control Using Optimum Search via Sliding Modes, IEEE Transactions on Control Systems Technology, vol. 3, No. 1, Mar. 1995, pp. 79-85.

Financial Times Energy, Inc. Economizers, Energy Design Resources, taken from http://www.energydesignresources.com/, believed to be available by at least Jan. 2007, 30 pages.

Guay et al., Adaptive Extremum Seeking Control of Nonlinear Dynamic Systems with Parametric Uncertainities, ScienceDiet, Pergamon, Automatica, 2003, pp. 1283-1293.

International Search Report and Written Opinion for International Patent Application No. PCT/US2008/070091, mailed Sep. 30, 2009, 13 pages.

International Search Report and Written Opinion for International Patent Application No. PCT/US2008/070118, mailed Oct. 19, 2009, 11 pages.

Killingsworth et al., PID Turning Using Extremum Seeking, IEEE Control Systems Magazine, Feb. 2006, pp. 70-79.

Krstic et al., Stability of Extremum Seeking Feedback for General Nonlinear Dynamic Systems, Automatica, vol. 36, Mar. 1997, pp. 595-601.

Krstic, Extremum Seeking Control for Discrete-Time Systems; IEEE Transactions on Automatic Control, University of California Postprints, 2002, pp. 318-323.

Krstic, Performance Improvement and Limitations in Extremum Seeking Control, Dec. 1998, pp. 313-326, Department of Mechanical and Aerospace Engineering, University of California—San Diego, La Jolla, CA.

Larsson, Literature Study on Extremum Control, Control and Automation Laboratory, Nov. 2001, pp. 1-14, Department of Signals and Systems, Chalmers University of Technology.

LeBlanc, Sur l'electrification des Chemins de fer au Moyen de Courants Alternatifs de Frequence Elevee, Revue Generale de l'Electricite, 1922.

Leyva et al., MPPT of Photovoltaic Systems using Extremum-Seeking Control, IEEE Transactions on Aerospace and Electronic Systems, vol. 42, No. 1, Jan. 2006, pp. 249-258.

Li et al., Extremum Seeking Control of a Tunable Thermoacoustic Cooler, IEEE Transactions on Control Systems Technology, vol. 13, No. 4, Jul. 2005, pp. 527-536.

Liu et al., Extremum-Seeking with Variable Gain Control for Intensifying Biogas Production in Anaerobic Fermentation, Water Science & Technology, vol. 53, No. 4-5, 2006, pp. 35-44.

Marcos et al., Adaptive Extremum-Seeking Control of a Continuous Stirred Tank Bioreactor with Haldane's Kinetics, Journal of Process Control, vol. 14, 2004, pp. 317-328.

Office Action for U.S. Appl. No. 11/699,860 dated Aug. 20, 2009, 18 pages.

Office Action for U.S. Appl. No. 11/699,859 dated Mar. 15, 2010, 12 pages.

Pan et al., Discrete-Time Extremum Seeking Algorithms, Proceedings of American Control Conference, Anchorage, Alaska, May 2002, pp. 3753-3758.

Popovic et al., Extremum Seeking Methods for Optimzation of Variable Cam Timing Engine Operation, Proceedings of the American Control Conference, Jun. 4-6, 2003, Denver, Colorado, pp. 3136-3141.

Rotea, Analysis of Multivariable Extremum Seeking Algorithms, Proceedings of the American Control Conference, pp. 433-437, Jun. 2000, Chicago, Illinois.

Salsbury, A Controller for HVAC Systems with Embedded Fault Detection Capabilities Based on Simulation Models, presented at the International Building Simulation Conference in Kyoto, Japan, Sep. 1999, 8 pages.

Sane et al., Building HVAC Control Systems—Role of Controls and Optimization, Proceedings of the American Control Conference, Minneapolis, Minnesota, Jun. 14-16, 2006, 6 pages.

Speyer et al., Extremum Seeking Loops with Assumed Functions, Proceedings of the 39th IEEE Conference on Decision and Control, Sydney, Australia, Dec. 2000, pp. 142-147.

Sternby, Extremum Control Systems—An Area for Adaptive Control?, Joint Automatic Control Conference, San Francisco, California, Aug. 13-15, 1980, 12 pages.

Teel et al., Solving Smooth and Nonsmooth Multivariable Extremum Seeking Problems by the Methods of Nonlinear Programming, Proceedings of American Control Conference, Arlington, Virginia, Jun. 2001, pp. 2394-2399.

Teel, Lyapunov Methods in Nonsmooth Optimization, Part I: Quasi-Newton Algorithms for Lipschitz, Regular Functions, Proceedings of the 39th IEEE Conference on Decision and Control, Sydney, Australia, Dec. 2000, pp. 112-117.

Teel, Lyapunov Methods in Nonsmooth Optimization, Part II: Persistently Exciting Finite Differences, Proceedings of the 39th IEEE Conference on Decision and Control, Sydney, Australia, Dec. 2000, pp. 118-123.

Titica et al., Adaptive Extremum Seeking Control of Fed-Batch Bioreactors, European Journal of Control, 2003, pp. 618-631.

Tsien, Engineering Cybernetics, McGraw-Hill Book Company, Inc., 1954.

Tunay, Antiskid Control for Aircraft via Etremum-Seeking, Proceedings of American Control Conference, Arlington, Virginia, Jun. 2001, pp. 665-670.

User's Manual for ANSI/ASHRAE/IESNA Standard 90.1-2004, Energy Standard for Buildings Except Low-Rise Residential Buildings, 7 pages.

Walsh, On the Application of Multi-Parameter Extremum Seeking Control, Proceedings of the American Control Conference, pp. 411-415, Jun. 2000, Chicago, Illinois.

Wang et al., Experimental Application of Extremum Seeking on an Axial-Flow Compressor, IEEE Transactions on Control Systems Technology, vol. 8, No. 2, Mar. 2000, pp. 300-309.

Wang et al., Extremum Seeking for Limit Cycle Minimization, IEEE Transactions on Automatic Control, vol. 45, No. 12, Dec. 2000, pp. 2432-2437.

Wang et al., Optimizing Bioreactors by Extremum Seeking, International Journal of Adaptive Control and Signal Processing, 1999, pp. 651-669.

Yu et al., Extremum-Seeking Control Strategy for ABS System with Time Delay, Proceedings of American Control Conference, Anchorage, Alaska, May 2002, pp. 3753-3758.

Yu et al., Extremum-Seeking Control via Sliding Mode with Periodic Search Signals, Proceedings of the 41st IEEE Conference on Decision and Control, Las Vegas, Nevada, Dec. 2002, pp. 323-328.

Zhang et al., Extremum-Seeking Nonlinear Controllers for a Human Exercise Machine, IEEE/ASME Transactions on Mechatronics, vol. 11, No. 2, Apr. 2006, pp. 233-240.

Zhang, Stability and Performance Tradeoff with Discrete Time Triangular Search Minimum Seeking, Proceedings of American Control Conference, Chicago, Illinois, Jun. 2000, pp. 423-427.

Notice of Allowance for U.S. Appl. No. 11/699,860, dated Aug. 23, 2010, 6 pages.

Office Action for U.S. Appl. No. 11/699,859, dated Aug. 31, 2010, 6 pages.

Office Action for U.S. Appl. No. 12/323,293, dated Feb. 3, 2011, 9 pages.

Examination Report for G.B. Patent Application No. 1000634.4, mailed Aug. 30, 2011, 2 pages.

Office Action for U.S. Appl. No. 12/683,883, dated Sep. 19, 2011, 7 pages.

* cited by examiner

EXTREMUM SEEKING CONTROL WITH RESET CONTROL

CROSS REFERENCE TO RELATED APPLICATIONS

This is a continuation of PCT Application No. PCT/US2008/070118, filed Jul. 16, 2008, which claims the benefit of U.S. Provisional Application No. 60/962,833, filed Aug. 1, 2007, and U.S. Provisional Application No. 60/950,314, filed Jul. 17, 2007. This application hereby expressly incorporates by reference the entirety of: PCT Application No. PCT/US2008/070118, filed Jul. 16, 2008, U.S. Provisional Application No. 60/962,833, filed Aug. 1, 2007, U.S. Provisional Application No. 60/950,314, filed Jul. 17, 2007, U.S. patent application Ser. No. 11/699,859, filed Jan. 30, 2007, and U.S. patent application Ser. No. 11/699,860, filed Jan. 30, 2007.

BACKGROUND

The present application generally relates to extremum seeking control strategies. The present application more particularly relates to regulating, via extremum seeking control, the amount of air that is flowing through a heating, ventilation and air conditioning (HVAC) system in order to reduce the amount of mechanical heating and cooling required within an air-handling unit (AHU).

Extremum seeking control (ESC) is a class of self-optimizing control strategies that can dynamically search for the unknown and/or time-varying inputs of a system for optimizing a certain performance index. It can be considered a dynamic realization of gradient searching through the use of dithering signals. The gradient of the system output with respect to the system input is typically obtained by slightly perturbing the system operation and applying a demodulation measure. Optimization of system performance can be obtained by driving the gradient towards zero by using an integrator in the closed-loop system. ESC is a non-model based control strategy, meaning that a model for the controlled system is not necessary for ESC to optimize the system.

An abrupt change in the operation of the plant of a traditional ESC system can cause an undesirable delay while the ESC adapts to the new optimal settings for the system. Where ESC is utilized for HVAC economizer applications, this may correspond to additional power being consumed by the AHU.

SUMMARY

The invention relates to a method for optimizing a control process for a plant. The method includes operating the plant using an extremum seeking control strategy. The method further includes detecting an abrupt change in the operation of the plant. The method yet further includes using a circuit to compensate for the abrupt change in the operation of the plant by resetting the extremum seeking control strategy.

The invention also relates to a controller for controlling a plant. The controller includes a circuit configured to operate the plant using an extremum seeking control strategy. The circuit is further configured to detect an abrupt change in the operation of the plant and to compensate for an abrupt change in the plant by resetting the extremum seeking control strategy.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, a controller is configured to control a plant using an extremum seeking control strategy. The extremum seeking control strategy is configured to detect and compensate for abrupt changes in the operation of the plant in order to reduce the amount of time needed for the controller to adapt to the new optimal settings for the plant.

Figure 1:
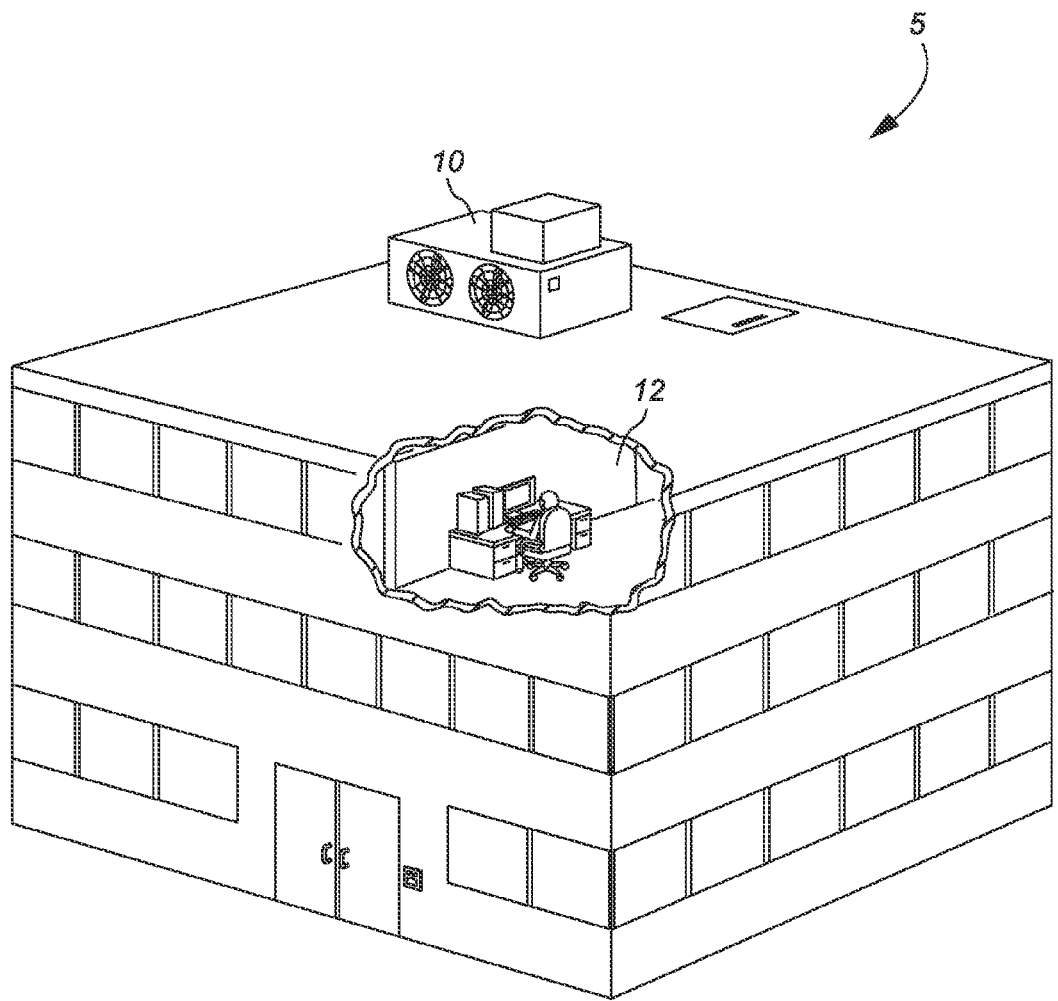
FIG. 1 is a perspective view of a building with an HVAC system, according to an exemplary embodiment.

FIG. 1 is a perspective view of a building 5 with an HVAC system, according to an exemplary embodiment. As illustrated, building 5 has an air handling unit (AHU) 10. AHU 10 is part of an HVAC system and is used to condition, chill, heat, and/or control the environment of a room 12 in building 5. The control system for AHU 10 utilizes extremum seeking to provide economizer functionality by optimizing the flow of air through AHU 10 in order to minimize the power consumption of AHU 10. According to various other exemplary embodiments, building 5 may contain more AHUs. Each AHU may be assigned a zone (e.g., room 12, a set of rooms, part of a room, floor, set of floors, part of a floor, etc.) of building 5 that the AHU is configured to affect (e.g., condition, cool, heat, ventilate, etc.). Each zone assigned to an AHU may be further subdivided through the use of variable air volume boxes or other HVAC configurations.

Figure 2:
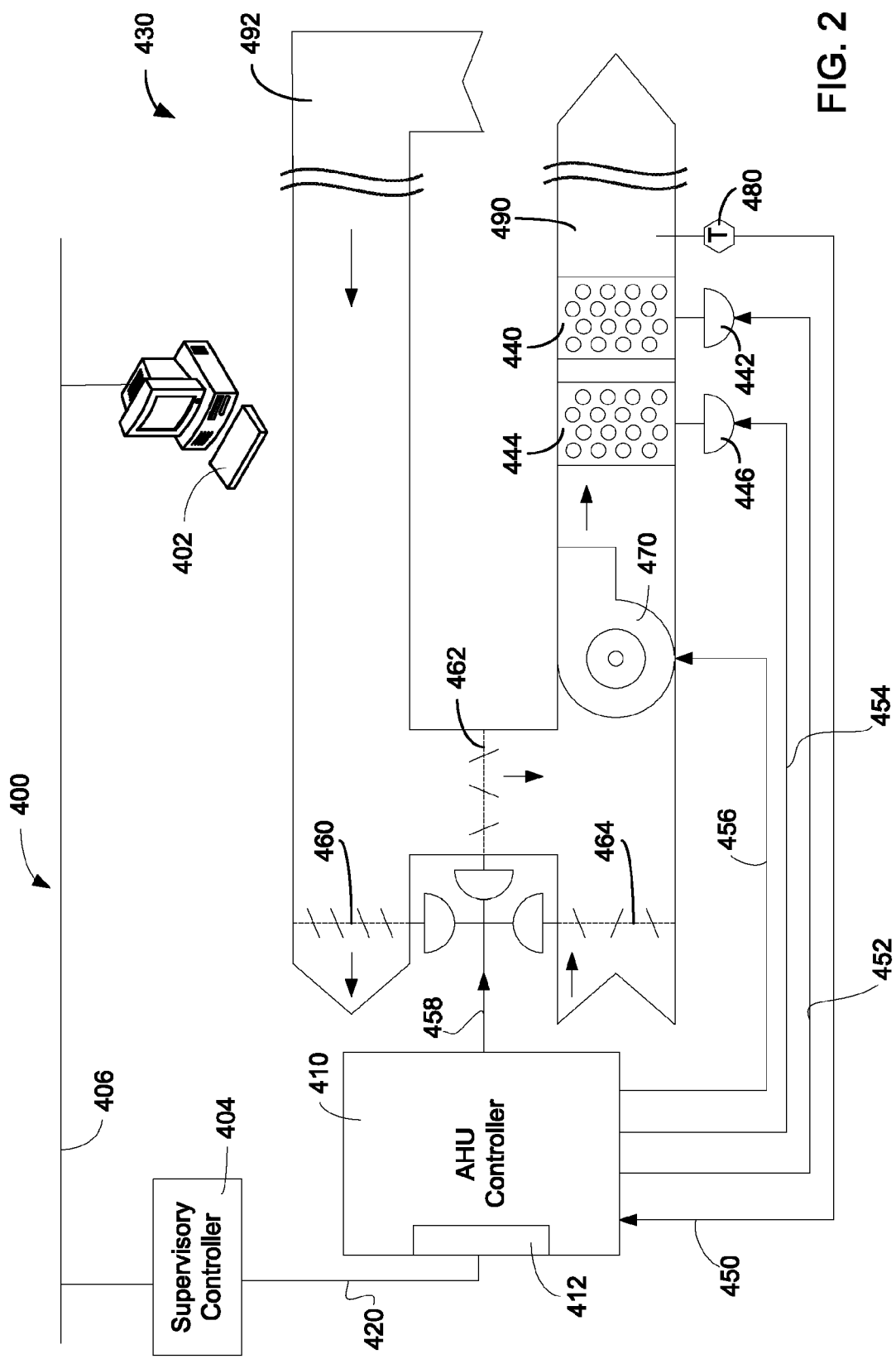
FIG. 2 is a schematic diagram of an environmental control system having an AHU, according to an exemplary embodiment.
Figure 3:
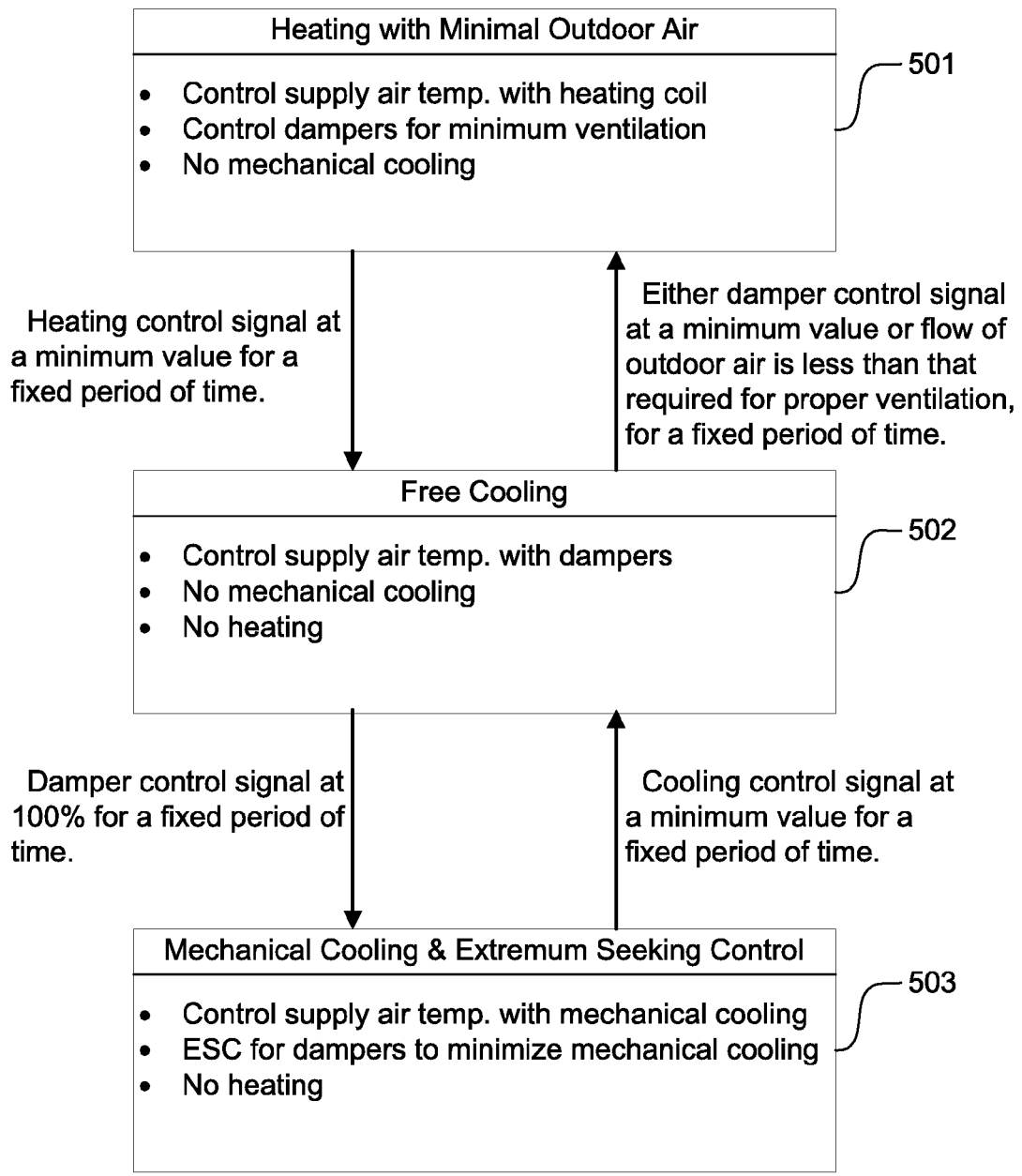
FIG. 3 is a state diagram of an AHU utilizing an extremum seeking control strategy, according to an exemplary embodiment.

Referring now to FIGS. 2 and 3, a schematic diagram of an environmental control system 400 having an AHU 430 is shown, according to an exemplary embodiment. Environment control system 400 includes a workstation 402, a supervisory controller 404 (e.g., a network automation engine (NAE)), and an AHU controller 410 which utilizes extremum seeking, according to an exemplary embodiment. AHU controller 410 is coupled to supervisory controller 404 via communications link 420. Workstation 402 and supervisory controller 404 are coupled via a communications bus 406. Communications bus 406 may be coupled to additional sections or additional controllers, as well as other components utilized in environment control system 400. Environment control system 400 may be a building automation system such as a METASYS® brand system manufactured by Johnson Controls, Inc. According to other exemplary embodiments, system 400 may be a unitary system having an AHU or another damper system.

In an exemplary embodiment, controller 410 is operatively associated with a controlled air handling unit such as AHU 430. Controller 410 is configured to operate as a finite state machine with the three states depicted in FIG. 3, wherein AHU 430 uses extremum seeking logic when in state 503. A transition occurs from one state to another, as indicated by the arrows, when a specified condition or set of conditions occurs. In an exemplary embodiment, the operational data of AHU 430 is checked when controller 410 is in a given state to determine whether a defined transition condition exists. A transition condition is a function of the present state and may also refer to a specific time interval, temperature condition, supply air condition and/or return air condition.

In an exemplary embodiment, a transition condition occurs when controller 410 remains in a given operating mode for a predetermined period of time without being able to adequately provide an output corresponding to a setpoint provided to the controller 410 by the supervisory controller 404. For example, a transition condition occurs in a mechanical cooling mode when the system is unable to provide an output of air at the desired temperature within a reasonable amount of time.

In state 501, valve 442 for heating coil 440 is controlled to modulate the flow of hot water, steam, or electricity to heating coil 440, thereby controlling the amount of energy transferred to the air. This maintains the supply air temperature at the setpoint. Dampers 460, 462, and 464 are positioned for a minimum flow rate of outdoor air and there is no mechanical cooling, (i.e. chilled water valve 446 is closed). The minimum flow rate of outdoor air is the least amount required for satisfactory ventilation to the supply duct 490. For example, 20% of the air supplied to duct 490 is outdoor air. The condition for a transition to state 502 is defined by the heating control signal remaining in the "No Heat Mode." Such a mode occurs when valve 442 of heating coil 440 remains closed for a fixed period of time (i.e. heating of the supply air is not required during that period). This transition condition can result from the outdoor temperature rising to a point at which the air from the supply duct 490 does not need mechanical heating.

In state 502, dampers 460, 462, and 464 alone are used to control the supply air temperature in supply duct 490 (i.e. no mechanical heating or cooling). In this state the amount of outdoor air that is mixed with the return air from return duct 492 is regulated to heat or cool the air being supplied via supply duct 490. Because there is no heating or mechanical cooling, the inability to achieve the setpoint temperature results in a transition to either state 501 or state 503. A transition occurs to state 501 for mechanical heating when either for a fixed period of time the flow of outdoor air is less than that required for proper ventilation or outdoor air inlet damper 464 remains in the minimum open position for a given period of time. The finite state machine makes a transition from state 502 to state 503 for mechanical cooling upon the damper control remaining in the maximum outdoor air position (e.g. 100% of the air supplied by the AHU is outdoor air) for a fixed period of time.

In state 503, chilled water valve 446 for cooling coil 444 is controlled to modulate the flow of chilled water and control the amount of energy removed from the air. At this time, extremum seeking control is used to modulate dampers 460, 462, and 464 to introduce an optimal amount of outdoor air into AHU 430. In an exemplary embodiment, a transition occurs to state 502 when the mechanical cooling does not occur for the fixed period of time (i.e. the cooling control is saturated in the no-cooling mode).

Referring further to FIG. 3, a state diagram of an AHU utilizing an extremum seeking control strategy is shown, according to an exemplary embodiment. In state 501, heating with minimum outdoor air required for ventilation is initiated. In cold climates, the initial state of control is a heating with minimum outdoor air state 501. The system starts up in state 501 to minimize the potential that cooling coil 444 and heating coil 440 could freeze. State 501 controls the supply air temperature by modulating the amount of heat supplied from heating coil 440. Dampers 460, 462, and 464 are controlled for minimum ventilation. In an exemplary embodiment, a transition to state 502 occurs after the heating control signal has been at its minimum value (no-heat position) for a fixed period of time.

In state 502, the system is utilizing outdoor air to provide free cooling to the system. State 502 controls the supply air temperature by modulating dampers 460, 462, and 464 to adjust the mixing of outdoor air with return air. In an exemplary embodiment, a transition to state 501 occurs after dampers 460, 462, and 464 have been at a minimum ventilation requirement for a fixed period of time or the damper control signal is at a minimum value for a fixed period of time. In an exemplary embodiment, a transition to state 503 occurs after dampers 460, 462, and 464 have been controlled to supply 100% outdoor air for a fixed period of time.

In state 503, the system utilizes mechanical cooling with an extremum seeking control strategy to control dampers 460, 462, and 464. State 503 controls the supply air temperature by modulating the flow rate of chilled water or refrigerant through cooling coil 444. An extremum seeking control strategy is used to determine the positions of dampers 460, 462, and 464 to minimize the amount of mechanical cooling required. An abrupt change in the operation of the plant of the extremum seeking control strategy may occur, causing AHU 430 to operate at non-ideal settings while the ESC strategy adapts to the change. In HVAC applications, a change in the operation of the plant may correspond to a change in the optimal settings for dampers 460, 462, and 464. Controller 410 has been adapted to limit the detrimental effects of an abrupt change in the operation of the plant. Ventilation requirements are set at a lower limit for the amount of outside air in supply duct 490. In an exemplary embodiment, a transition to state 502 occurs after the control signal for cooling has been in the no-cooling command mode for a fixed period of time.

Figure 4A:
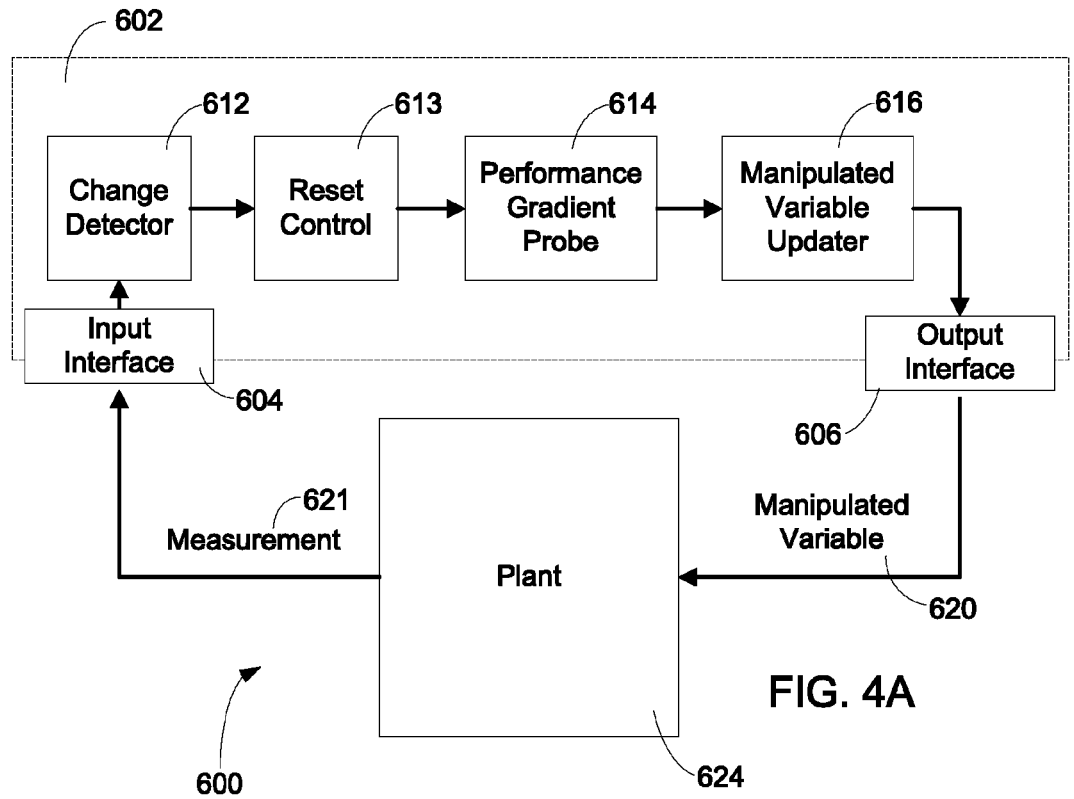
FIG. 4A is a block diagram of an extremum seeking control loop configured to detect and compensate for abrupt changes in the operation of the plant, according to an exemplary embodiment.

Referring to FIG. 4A, a block diagram of an ESC loop 600 configured to detect and compensate for abrupt changes in the operation of the plant is shown, according to an exemplary embodiment. A controller 602 having extremum seeking control logic continually modifies its output in response to changing measurement 621 received from plant 624 via an input interface 604. A plant in control theory is the combination of a process and one or more mechanically controlled outputs. Controller 602 uses change detector 612 to determine if an abrupt change has occurred in the operation of the plant, signifying that the optimal settings for plant 624 have suddenly changed. An "abrupt change" is application dependant and refers generally to any change in the operation of plant 624 that leads to an unwanted response delay by controller 602. For example, an abrupt change for an HVAC system may be a change of $\geq 2\%$ over the course of several minutes. In a jet engine, however, an abrupt change may be a change of a several percent over the course of a second. An abrupt change in the operation of a plant corresponds to a shifting of the optimal control parameters for the plant to a new set of optimal values, i.e. the extremum of the performance map suddenly changes. In an exemplary embodiment, change detector 612 may comprise an electronics circuit such as a differentiator or another electronics circuit that is capable of detecting abrupt changes in signals. In yet another exemplary embodiment, change detector 612 may be implemented as software and include logic to detect abrupt changes in data.

If an abrupt change in the operation of plant 624 is detected by change detector 612, reset control 613 resets controller 602. In an exemplary embodiment, reset control 613 toggles the power to controller 602. Turning controller 602 off and on again reinitializes ESC loop 600, thereby reducing the time needed for controller 602 to converge on the new optimal settings for plant 624. In another exemplary embodiment, reset control 613 forces a reset parameter into ESC loop 600 for a set period of time. The reset parameter and reset time period are system and application dependent. In an exemplary embodiment for an HVAC system, the reset parameter may be any value between the old and the new optimum setting for plant 624. The reset time period for the same HVAC system may be three to four times that of the dithering period used to detect the performance gradient. The output of controller 602 is effectively overridden for a short period of time to allow the ESC logic to adapt to the changes in the optimal settings for plant 624. In an exemplary embodiment, the reset parameter forced into ESC loop 600 may be the average of historical optimal settings for plant 624. In another exemplary embodiment, the reset parameter is used as an input to performance gradient probe 614. Manipulated variable updater 616 passes the overridden value for manipulated variable 620 to output interface 606. Output interface 606 then provides the overridden manipulated variable 620 to plant 624.

If an abrupt change in the operation of plant 624 is not detected by change detector 612, controller 602 uses normal ESC logic to control plant 624. Performance gradient probe 614 detects a performance gradient which corresponds to the difference between the manipulated variable 620 and the system performance of plant 624. If controller 602 is implemented as an electronics circuit, performance gradient probe 614 may include a high-pass filter, demodulation signal, low-pass filter and dither signal. If controller 602 is implemented as software, performance gradient probe 614 may be a mathematical operation to determine the performance gradient. Manipulated variable updater 616 receives performance gradient information from performance gradient probe 614 and produces a manipulated variable 620 to drive the performance gradient to zero. If controller 602 is implemented as an electronics circuit, manipulated variable updater 616 may include an integrator circuit. If controller 602 is implemented as software, manipulated variable updater 616 may include a program routine that performs integration. In an exemplary embodiment, manipulated variable updater 616 may be configured to perform integration only if an abrupt change has not been detected by change detector 612. Manipulated variable updater 616 then passes the updated manipulated variable 620 to plant 624 via output interface 606 in order to control plant 624.

Figure 4B:
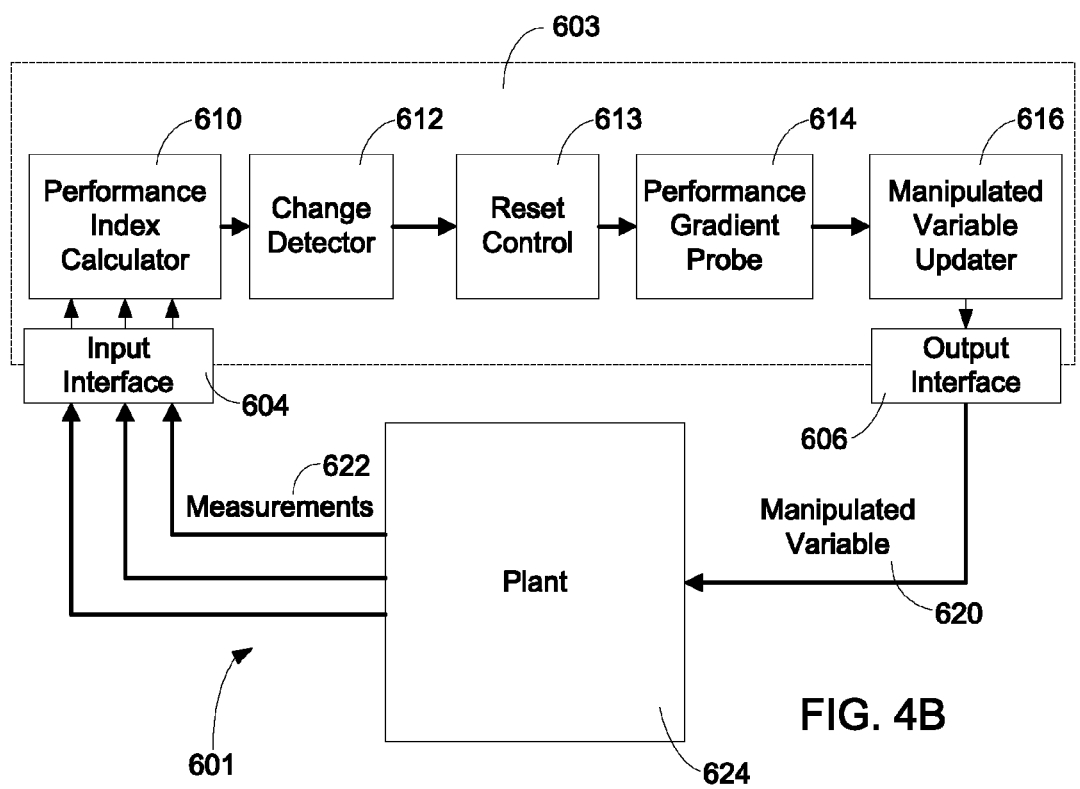
FIG. 4B is a block diagram of an extremum seeking control loop with a plurality of measurements and configured to detect and compensate for abrupt changes in the operation of the plant, according to an exemplary embodiment.

Referring to FIG. 4B, a block diagram of an extremum seeking control loop with a plurality of measurements and configured to detect and compensate for abrupt changes in the operation of the plant is shown, according to an exemplary embodiment. ESC loop 601 contains many of the functions and structures of ESC loop 600 (FIG. 4A), but utilizes a plurality of measurements 622 to determine a performance index. Controller 603 receives measurements 622 from plant 600 via input interface 604. A performance index is calculated by performance index calculator 610 using measurements 622. The performance index is a mathematical representation of the system performance of ESC loop 601 using measurements 622. Change detector 612 detects abrupt changes in the performance index and triggers reset control 613 if an abrupt change is detected. If an abrupt change is not detected, performance gradient probe 612 receives the performance index from performance index calculator 610 to detect the performance gradient. If an abrupt change is detected, reset control 613 provides a reset parameter to performance gradient probe 614 for a set period of time. Manipulated variable updater 616 produces an updated manipulated variable 620 based upon the output of performance gradient probe 614. In an exemplary embodiment, manipulated variable updater 616 includes an integrator to drive the performance gradient to zero. Manipulated variable updater 616 then provides an updated manipulated variable 620 to plant 624 via output interface 606.

Figure 5:
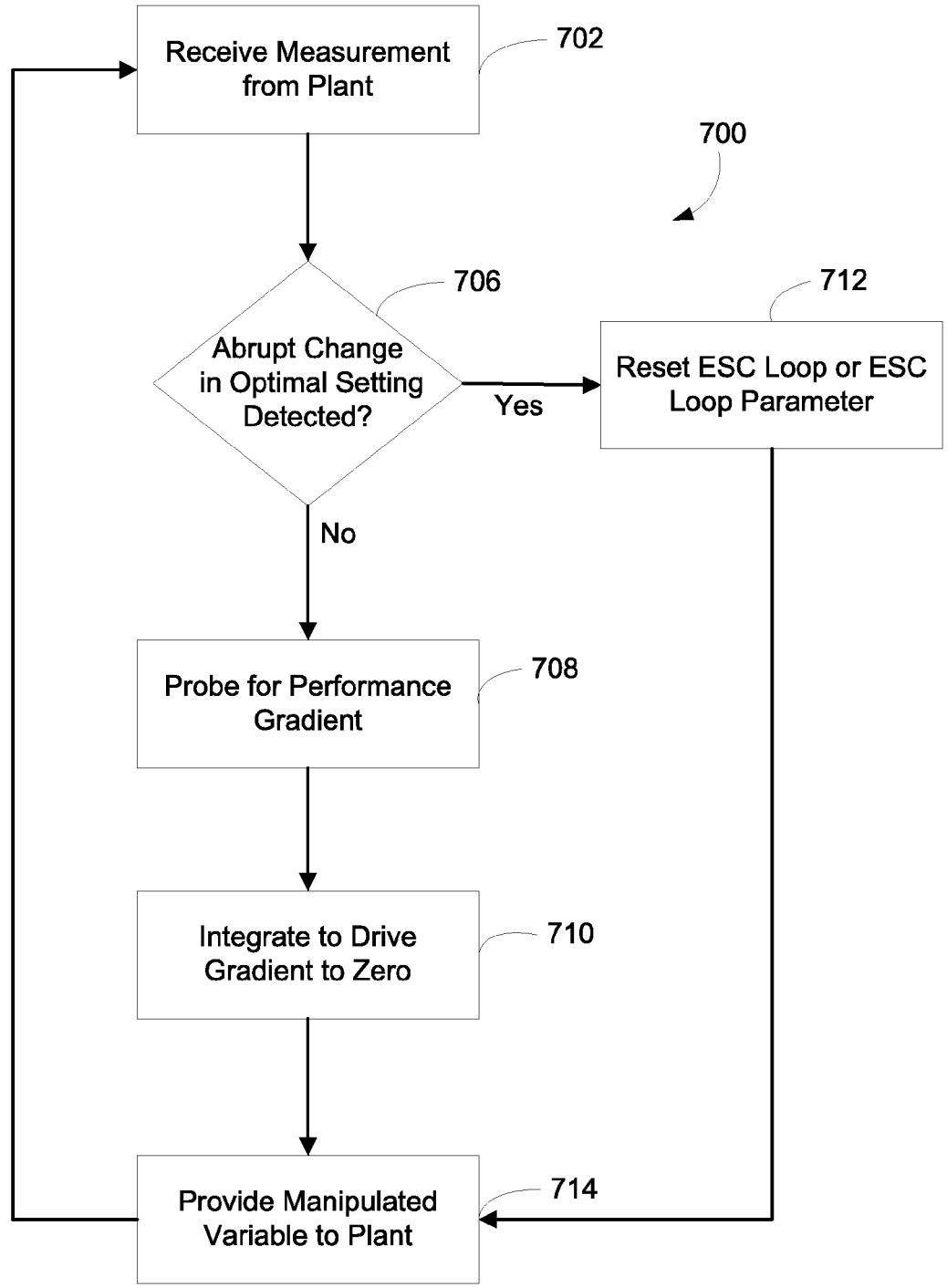
FIG. 5 is a flow diagram of a process for compensating for abrupt changes in the operation of the plant of an ESC loop, according to an exemplary embodiment.

Referring to FIG. 5, a flow diagram of a process for compensating for abrupt changes in the operation of the plant of an ESC loop is shown, according to an exemplary embodiment. The ESC loop may include a controller that utilizes extremum seeking control logic and a plant that receives a manipulated variable from the controller. For example, process 700 may be applied to ESC loop 600, as shown in FIG. 4A. Process 700 is shown to include receiving a measurement from the plant (step 702). In an exemplary embodiment, the controller for the ESC loop utilizes a single input measurement from the plant. It is noted the controller may also have a plurality of input measurements, such as in ESC loop 601 of FIG. 4B. In an exemplary embodiment for an HVAC system, measurements may include inputs from temperature sensors, humidity sensors, air flow sensors, damper positioning sensors or measurements of power consumption.

Process 700 is further shown to include determining if an abrupt change in the operation of the plant has been detected (step 706). If an abrupt change in the optimal settings for the ESC loop is detected in step 706, either the ESC loop parameters are reset or the ESC loop itself is reset (step 712). If the ESC loop parameters are reset (step 712), the manipulated variable sent to the plant from the controller is overridden to a fixed value (step 714). If the ESC loop itself is reset, i.e. turned off and on, the manipulated variable sent by the controller to the plant is momentarily zero to allow the controller to adapt to the abrupt change in the operation of the plant. If an abrupt change in the operation of the plant is not detected (step 706), the ESC strategy continues uninterrupted. Process 700 includes probing for a performance gradient (step 708)

and integrating the detected performance gradient to drive the gradient to zero (step 710). The controller then updates the manipulated variable and sends the updated manipulated variable to the plant (step 714).

Figure 6:
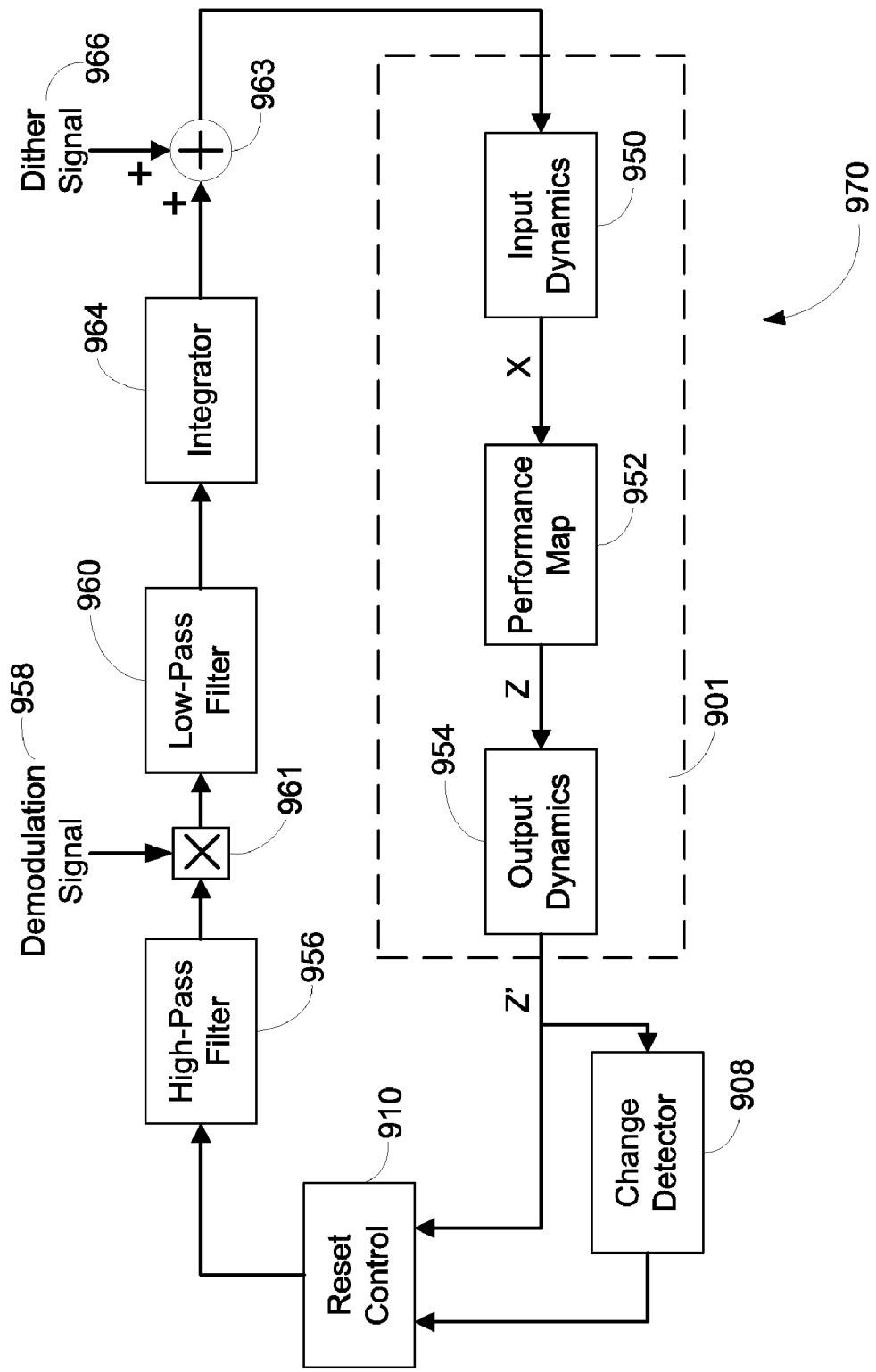
FIG. 6 is a filtering ESC loop configured to limit the effects of an abrupt change in the operation of the plant of the ESC loop, according to an exemplary embodiment.

In FIG. 6, a filtering ESC loop 970 configured to limit the effects of an abrupt change in the operation of the plant is shown, according to an exemplary embodiment. Filtering ESCs determine a performance gradient through the use of a high-pass filter, a demodulation signal, a low-pass filter and a dither signal. An integrator is then used to drive the performance gradient to zero in order to optimize the closed-loop system. In an exemplary embodiment, filtering ESC loop 970 includes a change detector 908 and reset control 910 to limit the effects of an abrupt change in the operation of plant 901. Plant 901 is controlled by filtering ESC loop 970 and can be represented mathematically as a combination of linear input dynamics 950, a non-linear performance map 952 and linear output dynamics 954. Input dynamics 950 receive a manipulated variable from ESC loop 970 and produce an input signal 'x' for nonlinear performance map 952. The output of the performance map 952, 'z', is then passed to output dynamics 954 to provide a return signal 'z' to the extremum seeking controller. ESC loop 970 seeks to find a value for 'x' that corresponds to an extremum of performance map 952. As an illustrative example only, output signal 'z' may be represented as the expression:

$$z = f(x) = (x - x_{opt})^2 + 2$$

where $f(x)$ represents the performance map and $x_{opt}$ represents the value at which $f(x)$ is minimized. The actual performance map in an ESC loop is system and application specific. An abrupt change in the operation of plant 901 controlled by filtering ESC loop 970 also corresponds to a sudden change in '$x_{opt}$'. In an exemplary embodiment, change detector 908 detects changes in measurements taken from plant 901, i.e. signal 'z'.

Filtering ESC loop 970 functions as a standard ESC loop when an abrupt change in the operation of plant 901 has not occurred. A performance gradient signal is produced in a manner common to ESCs through the combination of a dither signal 966 added at processing element 963, high-pass filter 956, a demodulator 961 using demodulation signal 958, and low-pass filter 960. The detected performance gradient is a function of the difference between 'x' and '$x_{opt}$'. Integration of the performance gradient by integrator 964 produces a new control signal for plant 901 that drives the performance gradient to zero. In an exemplary embodiment, change detector 908 monitors and detects changes in the gradient signal, since an abrupt change in the operation of plant 901 also corresponds to an abrupt change in the performance gradient.

If change detector 908 detects an abrupt change in the operation of plant 901, reset control 910 is triggered. In an exemplary embodiment, reset control 910 forces a reset parameter to high-pass filter 956 for a set amount of time in order to compensate for the abrupt change in the operation of plant 901. Forcing a reset parameter to high-pass filter 956 effectively changes the performance gradient for ESC loop 970 and can significantly reduce the amount of time necessary for ESC loop 970 to adapt to abrupt changes in the operation of plant 901. Integration of the altered performance gradient is then performed by integrator 964 and the resulting manipulated variable is then passed on to plant 901. In an alternate embodiment, reset control 910 forces ESC loop 970 to turn off and then on again if an abrupt change is detected by change detector 908.

Figure 7:
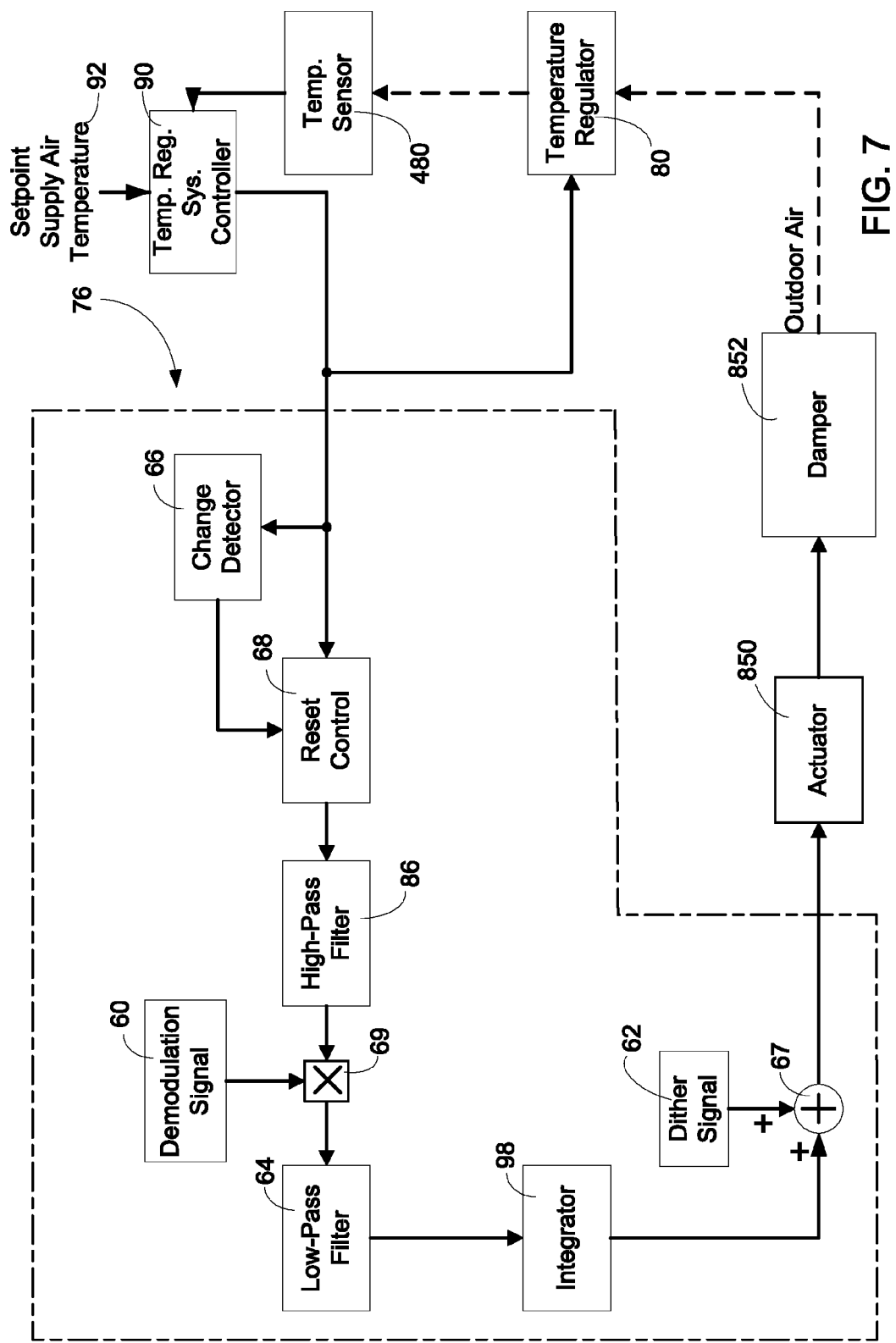
FIG. 7 is a diagram of an extremum seeking control loop for controlling an AHU, according to an exemplary embodiment.

In FIG. 7, a diagram of an extremum seeking control loop 76 for controlling an AHU is shown, in an exemplary embodiment. ESC loop 76 has been adapted to compensate for abrupt changes in the operation of the plant using change detector 66 and reset control 68. The AHU includes a temperature regulator 80, a temperature regulator system controller 90, a damper actuator 850 and damper 852. According to an exemplary embodiment, multiple actuators and/or dampers may be used to control airflow within the AHU. Temperature regulator 80 may be any mechanism used to alter air temperature. This may include, but is not limited to, cooling coils, heating coils, steam regulators, chilled water regulators or air compressors. In an exemplary embodiment, temperature regulator 80 lowers the temperature of the air. Temperature regulator system controller 90 maintains a supply air temperature at a setpoint 92 by adjusting the position of chilled water valve 446 of cooling coil 444 (FIG. 2). Actuator 850 maintains the damper 852 to provide between 0% and 100% outside air.

A control loop consisting of temperature regulator system controller 90, temperature regulator 80, and temperature sensor 480 controls the amount of mechanical cooling in the AHU, according to an exemplary embodiment. Temperature regulator system controller 90 receives a setpoint supply air temperature 92 from a supervisory controller 404 (FIG. 2), according to an exemplary embodiment. Temperature regulator system controller 90 also receives measurements from temperature sensor 480, which measures the temperature of the air supplied by the AHU to the building. Temperature regulator system controller 90 compares the setpoint temperature to the measured temperature and adjusts the amount of mechanical cooling provided by temperature regulator 80 to achieve the setpoint supply air temperature 92 using a control signal.

ESC loop 76 is connected to the temperature regulator control loop in order to control damper 852, which regulates the amount of outdoor air into the AHU. In an exemplary embodiment, ESC loop 76 determines an optimum setting for actuator 850 in order to maximize the use of outdoor air for cooling, thereby minimizing the power consumption of the temperature regulator 80. The performance gradient for ESC loop 76 is detected through the combination of a dither signal 62 added by processing element 67, high pass filter 86, demodulator 69 using demodulation signal 60, and low pass filter 64. Integrator 98 serves to drive the detected gradient to zero. A manipulated variable from integrator 98 is passed on to actuator 850 to regulate damper 852, thereby controlling the amount of air utilized by the AHU. The air from outside and/or air from other sources (e.g. return air) is combined and treated by temperature regulator 80 and then provided to the zone serviced by the AHU. Temperature sensor 480 measures the air supplied by the AHU and provides temperature information to temperature regulator system controller 90.

The effects of abrupt changes in the operation of the AHU are limited through the inclusion of change detector 66 and reset control 68. Change detector 66 receives information from the temperature regulator control loop to determine if an abrupt change has occurred in the operation of the AHU. For example, the optimal damper opening for damper 852 may suddenly have changed from 30% open to 60% open. Change detector 66 then triggers reset control 68 to force a set input to high-pass filter 86 for a predetermined amount of time to reduce the amount of time necessary for ESC loop 76 to adapt to the changes in the operation of the AHU. It should be appreciated that the functions of ESC loop 76 can be implemented as an electronic circuit, as software stored within a digital processing circuit or as a combination thereof Referring now to FIG. 8, a diagram of a control system for an AHU configured to compensate for abrupt changes in the operation of the AHU is shown, according to an exemplary embodiment. AHU controller 410 receives a temperature setpoint from supervisory controller 404. The temperature setpoint is used to drive a control loop consisting of a temperature regulator system controller 90, a temperature regulator system 952 and a temperature sensor 480. Temperature regulator system controller 90 compares the temperature measured by temperature sensor 480 to that of the setpoint temperature provided by supervisory controller 404. A temperature regulator command signal is then sent from controller 90 to temperature regulator system 952 to provide mechanical heating or cooling in order to drive the temperature of the air supplied by the AHU to that of the setpoint.

AHU controller 410 also contains an ESC loop 860 to control the position of outdoor air damper 852 via actuator 850. ESC loop 860 is coupled to the temperature regulator control loop in order to minimize the power consumption of the temperature regulator system 952. In an exemplary embodiment, ESC loop 860 searches for a setting for the damper opening that minimizes the power consumed by temperature regulator system 952 by making use of outdoor air. A performance gradient probe 862 detects a difference between the optimal settings for damper 852 and the current settings for damper 852. In an exemplary embodiment, performance gradient probe 862 utilizes a high pass filter, a demodulation signal, a low pass filter and a dither signal to detect the performance gradient. Integration of the gradient produces an actuator command signal to drive the actuator 850 to its optimal setting. Actuator 850 receives the actuator command signal and regulates damper 852, controlling the flow of outside air into the AHU.

The effects of an abrupt change in the operation of the plant for ESC loop 860 are limited through the inclusion of change detector 66 and reset control 68. Change detector 66 determines if an abrupt change has occurred in the operation of the plant for ESC loop 860, i.e. an abrupt change has occurred in the AHU, causing the optimal opening of damper 852 to also change abruptly. Reset control 68 is then triggered by change detector 66 to limit the effects of the abrupt change in the operation of the plant. In an exemplary embodiment, reset control 68 forces a reset parameter into ESC loop 860 for a period of time. For example, the reset parameter may be passed to the input of performance gradient probe 862. In another exemplary embodiment, reset control 68 turns ESC loop 860 off and on again if change detector 66 detects an abrupt change in the operation of AHU.

Figure 8:
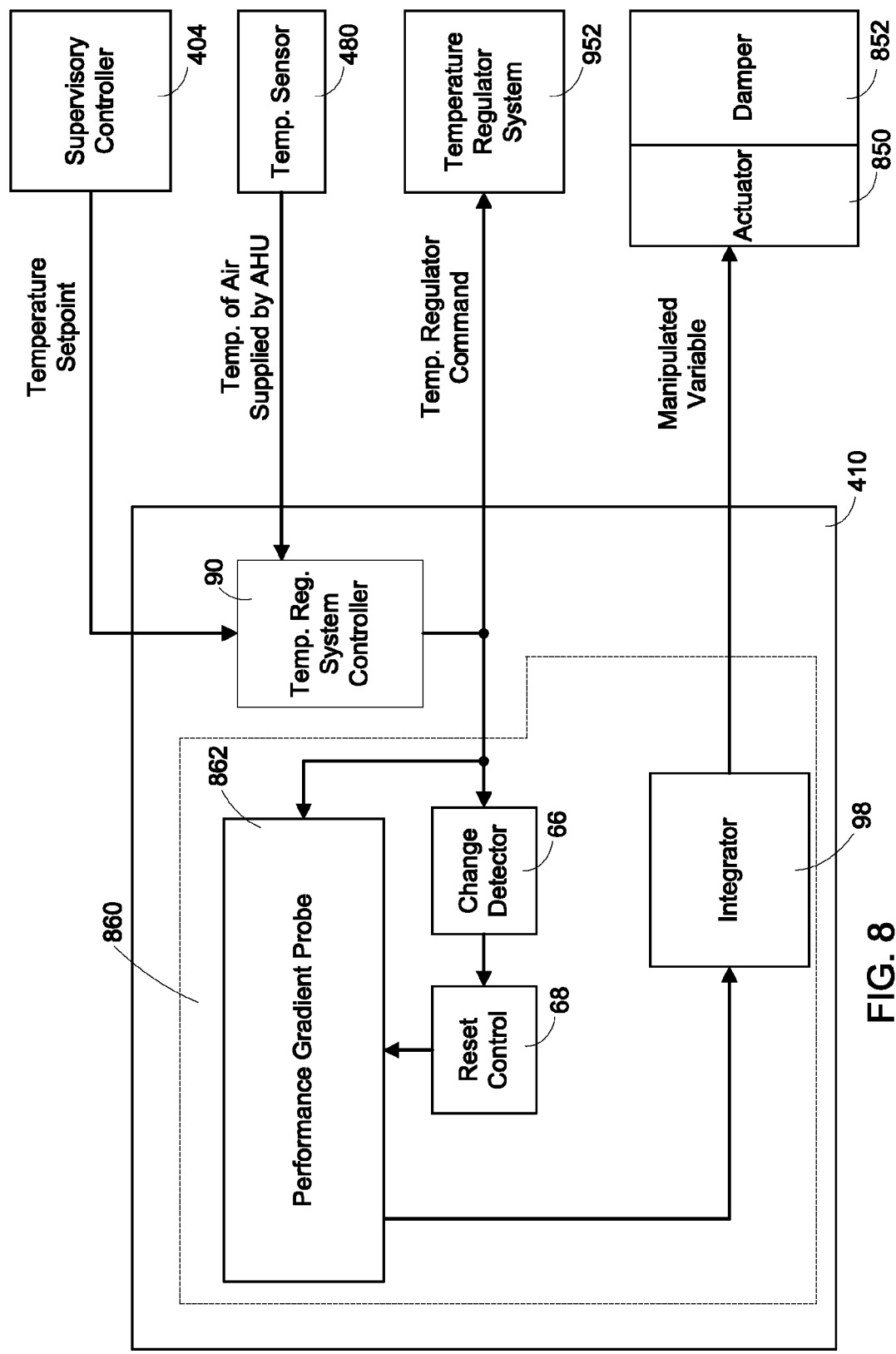
FIG. 8 is a diagram of a control system for an AHU configured to compensate for abrupt changes in the operation of the AHU, according to an exemplary embodiment.
Figure 9:
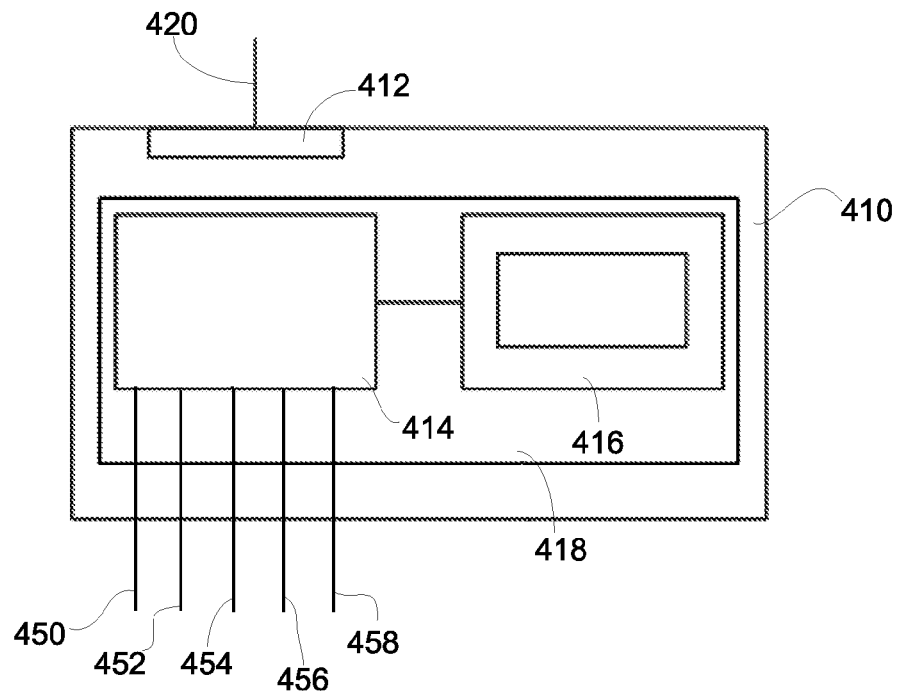
FIG. 9 is a block diagram of the controller shown in FIG. 8, according to an exemplary embodiment.

Referring to FIG. 9, a detailed block diagram of the controller 410 in FIG. 8 is shown, according to an exemplary embodiment. Controller 410 is shown to include a processing circuit 418. Processing circuit 418 is shown to include processor 414 and memory 416. Processing circuit 418 may be communicably coupled with fan control output 456, chilled water valve output 454, heating valve output 452, actuator command 458, temperature input 450 and communications port 412. According to various exemplary embodiments, processing circuit 418 may be a general purpose processor, an application specific processor, a circuit containing one or more processing components, a group of distributed processing components, a group of distributed computers configured for processing, etc. Processor 414 may be or include any number of components for conducting data processing and/or signal processing.

Memory 416 (e.g., memory unit, memory device, storage device, etc.) may be one or more devices for storing data and/or computer code for completing and/or facilitating the various processes described in the present disclosure, including that of using extremum seeking logic to control an AHU. Memory 416 may include a volatile memory and/or a non-volatile memory. Memory 416 may include database components, object code components, script components, and/or any other type of information structure for supporting the various activities described in the present disclosure. According to an exemplary embodiment, any distributed and/or local memory device of the past, present, or future may be utilized with the systems and methods of this disclosure. According to an exemplary embodiment, memory 416 is communicably connected to processor 414 (e.g., via a circuit or other connection) and includes computer code for executing one or more processes described herein. Memory 416 may include various data regarding the operation of a control loop (e.g., previous setpoints, previous behavior patterns regarding energy used to adjust a current value to a setpoint, etc.).

In an exemplary embodiment, the functions of controller 410, as depicted in FIG. 8, may be implemented as software stored within memory 416 of processing circuit 418. Supervisory controller 404 provides a setpoint to controller 410 through communication port 412. Temperature sensor 480 (FIG. 8) provides temperature input 450 to controller 410, which compares the measured temperature to the setpoint temperature. In an exemplary embodiment, a temperature regulator command is sent to chilled water valve output 454 to cool the air within the AHU. Extremum seeking control strategy 860 can be used to control actuator 850 for damper 852 via actuator command 458. In an exemplary embodiment, changes in the optimal settings for damper 852 are detected and the parameters to ESC loop 860 are reset. The reset parameters may be determined by averaging historical optimal parameters for ESC loop 860 stored in memory 416. The reset parameters may also be determined by storing and reusing the optimal parameters for the ESC loop 860 that correspond to the time period directly before the abrupt change in the operation of the plant occurred. In another exemplary embodiment, the ESC control loop is reset if an abrupt change in the operation of the plant is detected.

Figure 10:
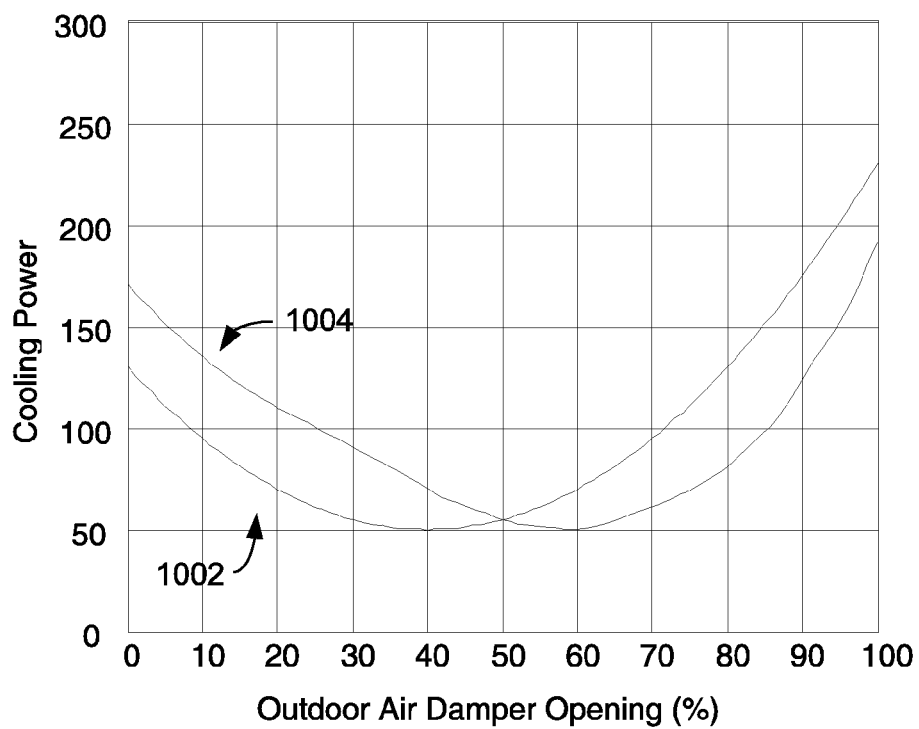
FIG. 10 shows a graph of performance maps for an extremum seeking control strategy controlling an AHU, according to an exemplary embodiment.

FIG. 10 shows a graph of performance maps for an extremum seeking control strategy controlling an AHU, according to an exemplary embodiment. Although the actual performance map in ESC systems is typically unknown, graph 1000 illustrates an abrupt change in the operation of the AHU, corresponding to a shift in the extremum of performance map 1002. For example, the extremum of performance map 1002 occurs at a damper opening of 40%, i.e. the mechanical cooling power required by the AHU is minimized when the outdoor air damper is 40% open. The extremum seeking control strategy will detect a performance gradient between the actual damper opening and 40%. The performance gradient is then used to drive the damper opening to its optimal setting of 40%.

In an illustrative example, if an abrupt change occurs in the operation of the plant, performance map 1002 may suddenly shift to that of performance map 1004. Performance map 1004 has an extremum corresponding to a damper opening of 60%. The extremum seeking control strategy will eventually adapt to the new extremum, but the time taken for the strategy to adapt means unnecessary power will be consumed by the AHU. Resetting the parameters to the extremum seeking control strategy, or resetting the strategy itself, reduces the amount of time necessary for the extremum seeking control strategy to converge to the new extremum. In an exemplary embodiment, the reset parameters are determined using historical data on prior optimal settings (extrema) for the control process. Referring back to the example of an abrupt shift from performance map 1002 to performance map 1004, the extremum seeking control strategy may use reset parameters corresponding to a damper opening of 40% for a short period of time. In another exemplary embodiment, the extremum seeking control strategy uses an average of historical data on the control process to determine the reset parameters.

The reset control described in the present application could be applied to many different HVAC configurations. For example, one or a plurality of dampers may be used to control airflow throughout and/or within the AHU. An extremum seeking control strategy can be used to control the one or more dampers to minimize power consumption by the AHU. Referring back to FIG. 2, the amount of air utilized to reduce power consumption by the AHU can be regulated by a combination of exhaust damper 460, recirculation air damper 462, and outdoor air inlet damper 464. For example, if $\theta_{ex}$, $\theta_{re}$, and $\theta_{out}$ represent the fraction of fully open position of dampers 460, 462, and 464, respectively, the damper positions can be interrelated as follows:

$$\theta_{re}=1-\theta_{ex}$$

$$\theta_{out}=1-\theta_{re}=\theta_{ex}$$

In this example, the relationship between the damper openings is such that ESC can be used to optimize the control of any damper, because optimization of one damper opening leads to the optimization of all damper openings.

In yet another exemplary embodiment, one or more dampers may have fixed positions while other damper openings are variable and interrelated. In this embodiment, the damper positions for dampers 460, 462, and 464 may be as follows:

$$\theta_{out}=1, \theta_{ex}=\text{manipulated variable from the ESC, and}$$
$$\theta_{re}=1-\theta_{ex}$$

In this example, ESC is used to optimize the control of damper 460 to minimize the power consumption of the AHU, while outdoor air inlet damper 464 remains fully open and damper 462 varies based on damper 460. ESC can therefore be used to optimize any combination of fixed position dampers and interrelated variable position dampers in an AHU, where ESC is used to control one or more of the variable position dampers.

ESC can also directly control more than one damper at a time. For example, multiple ESC controllers may be used to control a plurality of independent dampers. Alternatively, a single ESC controller with multiple inputs and/or output can be used to regulate a plurality of independent dampers. The dampers in an AHU controlled by the extremum seeking control strategy may include, but are not limited to, outside air inlet dampers, recirculation air dampers, exhaust dampers, or a combination thereof.

The construction and arrangement of the systems and methods as shown in the various exemplary embodiments are illustrative only. Although only a few embodiments have been described in detail in this disclosure, many modifications are possible. All such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures may show a specific order of method steps, the order of the steps may differ from what is depicted. Also two or more steps may be performed concurrently or with partial concurrence. Such variations will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for optimizing a control process for a plant, the method comprising:
    operating the plant using circuitry that implements an extremum seeking control strategy;
    detecting an abrupt change in the operation of the plant; and
    using a circuit to compensate for the abrupt change in the operation of the plant by resetting the extremum seeking control strategy;
    wherein resetting the extremum seeking control strategy comprises providing a reset parameter to a high-pass filter of the circuitry that implements the extremum seeking control strategy such that a performance gradient that is probed for using the high-pass filter is forced to change faster than it would normally change given the abrupt operation of the plant.

2. The method of claim 1, wherein detecting an abrupt change in the operation of the plant comprises:
    detecting a change of greater than or equal to two percent in the performance of the plant within a defined time period.

3. The method of claim 1, further comprising:
    retrieving historical data on one or more optimum plant settings previously determined by the extremum seeking control strategy from memory; and
    using the historical data to determine the reset parameter.

4. The method of claim 1, wherein the reset parameter is provided for three to four times a dithering period of the extremum seeking control strategy.

5. The method of claim 1, wherein the plant is an air handling unit configured to regulate temperature and controlled by a controller configured to provide a control signal to a temperature regulator, wherein the air handling unit also includes a damper controlled by an actuator, and wherein the extremum seeking control strategy is used to operate the actuator.

6. A controller for controlling a plant, the controller comprising:
a circuit configured to operate the plant using an extremum seeking control strategy, the circuit configured to detect an abrupt change in the operation of the plant and the circuit further configured to compensate for the abrupt change by resetting the extremum seeking control strategy, wherein resetting the extremum seeking control strategy comprises providing a reset parameter to a high-pass filter used by the circuit to probe for a performance gradient of the extremum seeking control strategy, the reset parameter applied to the high-pass filter such that the performance gradient observed by the extremum seeking controller is forced to change faster than it would normally change given the abrupt operation of the plant.

7. The controller of claim 6, wherein the circuit is further configured to retrieve historical data of one or more optimum plant settings previously determined by the extremum seeking control strategy from memory, and wherein the circuit is configured to use the historical data to determine the reset parameter.

8. The controller of claim 6, wherein the plant is an air handling unit configured to regulate temperature and controlled by a controller configured to provide a control signal to a temperature regulator, wherein the air handling unit also includes a damper controlled by an actuator, and wherein the extremum seeking control strategy is used to operate the actuator.

9. The controller of claim 6, wherein the circuit is further configured to provide the reset parameter to the extremum seeking control strategy for at least three times a dithering period of the extremum seeking control strategy.

10. The controller of claim 6, wherein the reset parameter overrides the measurement received from the plant and used by the extremum seeking control strategy.

11. A controller for an air handling unit having an actuator that opens and closes a damper to control the amount of outdoor air used for cooling the air provided to a building space by the air handling unit, comprising:
an input interface configured to receive a temperature sensor input;
a temperature regulator control module configured to provide a command to a temperature regulator system configured to controllably chill air provided by the air handling unit, wherein the temperature regulator control module determines the command based on the temperature sensor input received at the input interface;
an extremum seeking control module configured to receive the command from the temperature regulator control module and comprising logic configured to use the command to calculate one or more parameters of a signal estimated to cause the damper to be positioned to maximize the use of outdoor air used for cooling the air provided by the air handling unit;
an output interface configured to provide the signal to the actuator for the damper according to the parameter or parameters calculated by the extremum seeking control module;
a reset control module;
a change detection module configured to determine when an abrupt change in the command has occurred and to provide the determination to the reset control module;
wherein the reset control module is configured to respond to the determination that an abrupt change has occurred by providing an output to the extremum seeking control module that is configured to eliminate or reduce a response by the extremum seeking control module to the abrupt change in the command.

12. The controller of claim 11, wherein the reset control module is configured to provide the output to the extremum seeking control module by overriding the command provided from the temperature regulator control module to the extremum seeking control module.

13. The controller of claim 12, wherein the reset control module is configured to hold the overriding of the command for a period of time prior to allowing the extremum seeking control module to resume using the command from the temperature regulator control module.

14. The controller of claim 13, wherein the reset control module is configured to select the magnitude of the override based on historical values of the command received prior to the detection of the abrupt change.

* * * * *